United States Patent
Tarascon et al.

(10) Patent No.: US 12,139,416 B2
(45) Date of Patent: Nov. 12, 2024

(54) FLUORINATED OXIDE BASED ON Li AND Mn

(71) Applicants: LE CENTRE NATIONAL DE LA RECHERCHE SCIENTIFIQUE, Paris (FR); COLLEGE DE FRANCE, Paris (FR); SPECIALTY OPERATIONS FRANCE, Lyons (FR)

(72) Inventors: Jean-Marie Tarascon, Paris (FR); Jiwei Ma, Paris (FR); Laure Bertry, Aubervilliers (FR); Robin Amisse, Paris (FR); Marc-David Braida, Bry-sur-Marne (FR); Thierry Le Mercier, Rosny-sous-Bois (FR); Valérie Buissette, Paris (FR)

(73) Assignees: LE CENTRE NATIONAL DE LA RECHERCHE SCIENTIFIQUE, Paris (FR); COLLEGE DE FRANCE, Paris (FR); SPECIALTY OPERATIONS FRANCE, Lyons (FR)

( * ) Notice: Subject to any disclaimer, the term of this patent is extended or adjusted under 35 U.S.C. 154(b) by 981 days.

(21) Appl. No.: 17/049,658

(22) PCT Filed: Apr. 25, 2019

(86) PCT No.: PCT/EP2019/060659
§ 371 (c)(1),
(2) Date: Oct. 22, 2020

(87) PCT Pub. No.: WO2019/207065
PCT Pub. Date: Oct. 31, 2019

(65) Prior Publication Data
US 2021/0070630 A1    Mar. 11, 2021

(30) Foreign Application Priority Data
Apr. 26, 2018 (EP) .................................... 18305518

(51) Int. Cl.
*H01M 4/505* (2010.01)
*C01G 45/12* (2006.01)
(Continued)

(52) U.S. Cl.
CPC ......... *C01G 45/1228* (2013.01); *C01G 51/50* (2013.01); *C01G 53/50* (2013.01);
(Continued)

(58) Field of Classification Search
None
See application file for complete search history.

(56) References Cited

U.S. PATENT DOCUMENTS

| | | | |
|---|---|---|---|
| 5,378,318 A * | 1/1995 | Weling | H01L 21/31116 257/E21.252 |
| 5,674,645 A | 10/1997 | Amatucci et al. | |
| 5,759,715 A | 6/1998 | Barker et al. | |
| 6,203,944 B1 | 3/2001 | Turner et al. | |

(Continued)

FOREIGN PATENT DOCUMENTS

| | | |
|---|---|---|
| WO | 0003444 A1 | 1/2000 |
| WO | 2013180781 A1 | 12/2013 |

OTHER PUBLICATIONS

Robert A. House et al: "Lithium manganese oxyfluoride as a new cathode material exhibiting oxygen redox", Energy & Environiiental Science, vol. 11, No. 4, ZO Feb. 2018 (Aug. 28, 2018), pp. 926-932, XP855488140, Cambridge ISSN: 1754-5692, DOI: 18.1839/C7EE03195E.

(Continued)

Primary Examiner — Tracy M Dove
(74) Attorney, Agent, or Firm — Osha Bergman Watanabe & Burton LLP

(57) ABSTRACT

The present invention relates to the new process of preparation of a Li-rich layered oxide based on Mn and optionally
(Continued)

Figure 1:
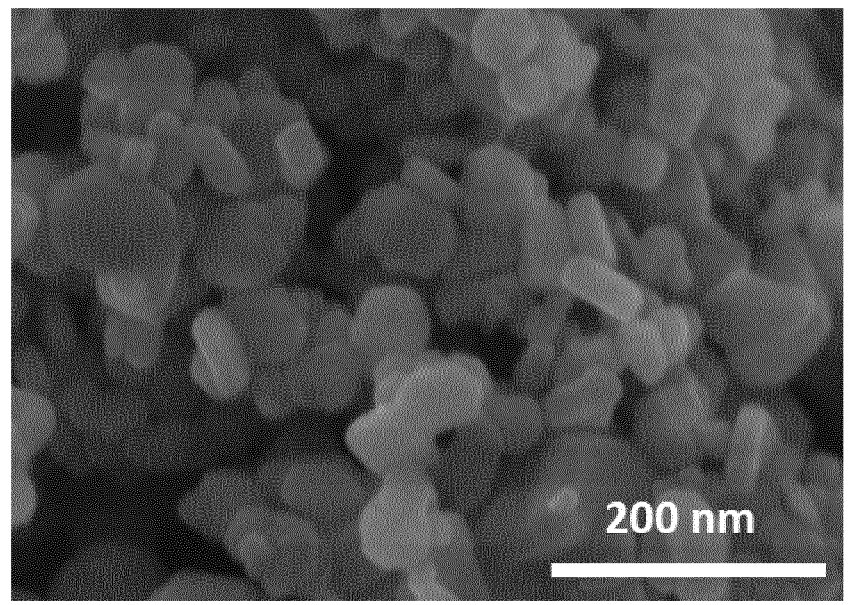

on Ni and/or Co in which F is incorporated within the crystal of the oxide (or "fluorinated oxide"). It also relates to the new fluorinated oxide its use as a component in a cathode of a battery.

12 Claims, 5 Drawing Sheets

(51) Int. Cl.
  *C01G 51/00* (2006.01)
  *C01G 53/00* (2006.01)
  *H01M 4/525* (2010.01)
  *H01M 4/62* (2006.01)
  *H01M 10/0525* (2010.01)
  *H01M 4/02* (2006.01)

(52) U.S. Cl.
  CPC ........... *H01M 4/505* (2013.01); *H01M 4/525* (2013.01); *H01M 4/623* (2013.01); *H01M 4/625* (2013.01); *H01M 10/0525* (2013.01); *C01P 2002/85* (2013.01); *C01P 2002/86* (2013.01); *C01P 2004/03* (2013.01); *C01P 2004/64* (2013.01); *C01P 2006/40* (2013.01); *H01M 2004/028* (2013.01)

(56) References Cited

U.S. PATENT DOCUMENTS

2012/0164532 A1* 6/2012 Senoue ................ H01M 4/505
  429/219
2014/0367609 A1 12/2014 Kapylou et al.
2018/0277840 A1* 9/2018 Dambournet ........... C30B 29/64

OTHER PUBLICATIONS

Yu Zhang et al: eSynthesis and electrochemical properties of monoclinic fluorine-doped lithium manganese oxide ($Li_x MnO_{2-y} F_y$) for lithium secondary batteries, RSC Advances, vol. 5, No. 109, Oct. 14, 2815 (Oct. 14, 2815), pp. 90150-90157, XP855488144, DOI: 18.1839/C5RA19751A.

Jianming Zheng et al: "Improved electrochemical performance of Li [Li 8.2Mn0.54Ni0. 13COO. 13] 02 cathode material by fluorine incorporation", Electrochimica Acta, vol. 185, Aug. 1, 2813 (2813-88-81), pp. 200-208, XP855895378, ISSN: 8013-4686, DOI:10.1016/j .el ectacta.2813 .04 . 158.

Jinhyuk Lee, et al: "Mitigating oxygen loss to improve the cycling performance of high capacity cation-disordered cathode materials", Nature Communications , vol. 8, Article No. 981 (2017), ISSN: 2041-1723, DOI: 10.1038/s41467-017-01115-0.

Freire M et al: "A new active Li—Mn—O compound for high energy density Li-ion batteries" Nature Materials, 2016; 15(2):173-177, 6 Macmillan Publishers Limited , ISSN : 1476-1122, DOI: 10.1038/NMAT4479.

* cited by examiner

FLUORINATED OXIDE BASED ON Li AND Mn

The present application is a U.S. national phase entry under 35 U.S.C. § 371 of International Application No. PCT/EP2019/060659, filed on Apr. 25, 2019, which claims the priority of European patent application EP 18305518 filed on Apr. 26, 2018. The entire contents of these applications are explicitly incorporated herein by this reference. In case of any incoherency between the present application and the EP application that would affect the clarity of a term or expression, it should be made reference to the present application only.

The present invention relates to the new process of preparation of a Li-rich layered oxide based on Mn and optionally on Ni and/or Co in which F is incorporated within the crystal of the oxide (or "fluorinated oxide"). It also relates to the new fluorinated oxide its use as a component in a cathode of a battery.

BACKGROUND OF THE INVENTION

Today's society relies on the use of electrochemical energy storage, mainly rechargeable Li-ion batteries, to power many objects like portable electronics and electric vehicles. With the ongoing technological revolution associated with electric mobility, integration of renewable energy sources, and connected objects, our dependence on batteries will become greater than ever. As the global demand for batteries increases, special focus remains on the popular Li-ion technology that surpasses its predecessors (lead-acid, nickel-cadmium, and nickel-metal hydride) in terms of energy density (Wh·L$^{-1}$) and lifetime (years). It is becoming even more popular thanks to continual performance improvements and falling costs (estimated to drop below 100 € kW·h$^{-1}$ by 2025).

These high expectations put pressure on the Li-ion technology which must preserve its supremacy by continually improving in energy density and sustainability, bearing in mind that today's cathodes are mainly based on cobalt—a chemical element with geopolitical and ethical concerns. Towards these goals, the lights are back to green with the recent discovery of anionic redox chemistry by our group, which allows extra energy storage via electrochemical activity of ligands, hence enabling a nearly doubled capacity in Li-rich Mn-based layered oxides, such as $Li_{1.2}Ni_{0.13}Mn_{0.54}Co_{0.13}O_2$ (aka Li-rich NMC) and $Li_{1.2}Ni_{0.2}Mn_{0.6}O_2$, which serve as cobalt-lean alternatives for replacing today's $LiCoO_2$ and $LiNi_{1/3}Mn_{1/3}Co_{1/3}O_2$ (NMC) cathodes.

Li-rich layered oxides have drawn great hopes as next generation cathode materials for high energy density Li-ion batteries, relying on both cationic and anionic redox processes. However, their practical implementation in the next generation of Li-ion batteries is plagued by difficulties in lowering their voltage decay upon cycling together with their origin oxygen release during oxidation which after their capacity fading afterwards with this effect being more pronounced for the practical and sustainable 3d metals such as Mn. Among that line the Li-rich layered oxides, $Li_2MnO_3$ having cheap and environmentally benign, Mn$^{4+}$ could show a theoretical capacity of ~460 mAh g$^{-1}$ provided two lithium can be removed. In a layer notation usually used in the field of materials for cathodes, $Li_2MnO_3$ can be written as $Li[Li_{1/3}Mn_{2/3}]O_2$, where one third of the position in the Mn-plane is replaced by Li to form an ordered $LiMn_2$ slab, together with Li inter-slab layer stack into the C2/m space group. Till now such materials was shown attractive initial capacity that drastically decays upon cycling alike the pure disorder rocksalt structure reported by Pralong et al. (Nat. Mater. 2016, 15, 173-177). More information about Li-rich oxides may also be found in Electrochimica Acta 2013, 105, 200-208.

A classical way, widely practice over the years, to master materials surface degradation, is enlisting treatment with fluorine (see $Li_2Ni_{0.5}Mn_{0.5}O_4$, $LiMn_2O_{4-x}F_x$ and many others). Incorporation of F into a Li-rich layered oxide based on Mn and optionally on Ni and/or Co is sought after to increase the voltage of the materials and to reduce the valence of the transition metals by substituting $O_2^-$ by F. In most of cases the incorporation of F was attended by a ceramic process, mainly using LiF as a flux hence enabling a confocal deposit around the particles of the oxide. Occasionally, the incorporation of F into the oxide could be proved by tiny lattice parameters changes as reported for the spinel (Amatucci and Tarascon, U.S. Pat. No. 5,674,645 (1997)) or as recently claimed by Ceder's group (Nat. Commun. 2017, 8, 981) in a layered oxide ($Li_{1.15}Ni_{0.45}Ti_{0.3}Mo_{0.1}O_{1.85}F_{0.15}$). However, the incorporation of F into the oxide is not proven. A recent drive towards the incorporation of F into $Li_4Mn_5O_{12}$ was recently attempted by P. G. Bruce via mechanical milling (Energy Environ. Sci. 2018, 11, 926-932). The hardness of this mechanical process results in the formation of a new phase within which F is an integer and cannot be changed. Moreover, ball-milling is likely to affect the crystallinity of the material and decrease too much the size of the particles.

In addition, the direct fluorination on $Li_2MnO_3$ via high temperature has failed due to the high affinity of lithium and fluorine, leading to the direct formation of LiF instead of oxide lattice substitution, while ball milling results in a full amorphization of the phase without any evidence for interstitial F as deduced by NMR.

In Electrochimica Acta 2013, 105, 200-208, a product of generic formula $Li[Li_{0.2}Mn_{0.54}Ni_{0.13}Co_{0.13}]O_{2-x}F_x$ is prepared. In this product, the amount of Li is 1.2 whereas in formula (II) of claim 1 and in formula (I) of claim 2, x is below ⅔. Moreover, the detailed process of preparation of such product does not involve an oxygen-deficient oxide as a starting material. The same applies to US 2014/367609.

Technical Problem to be Solved

In this context, a problem to be solved is therefore to find a convenient and clean process to incorporate F into a layered oxide based on Mn and optionally on Ni and/or Co. Another problem is also in preparing a new layered oxide based on Mn and optionally on Ni and/or Co in which F is inserted within the crystal of the oxide which can be used efficiently in a high energy density Li-ion battery.

FIGURES

FIG. 1 highlights the morphology and particle size of the oxide of formula $Li_{4/3}Mn_{2/3}O_2$ prepared by the solvothermal precipitation, determined by scanning electron microscopy (SEM).

Figure 2:
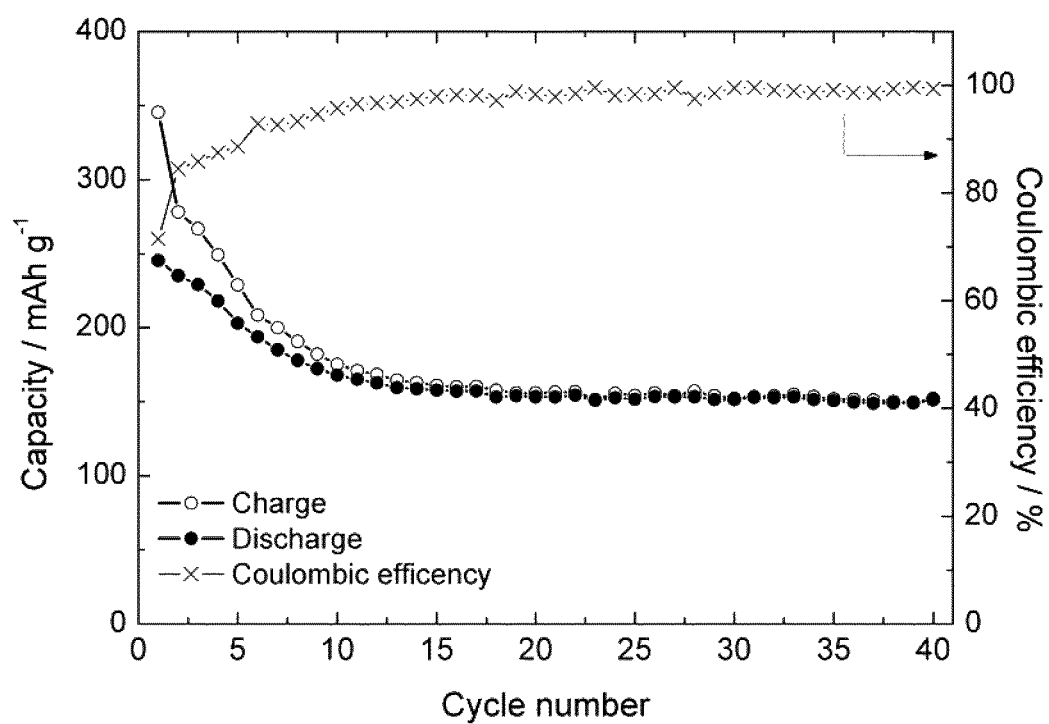

FIG. 2 discloses the cycling performance of a Li battery at a current rate of C/20 (1C=460 mA g$^{-1}$) comprising a cathode prepared with the oxide of example 1.

Figure 3:
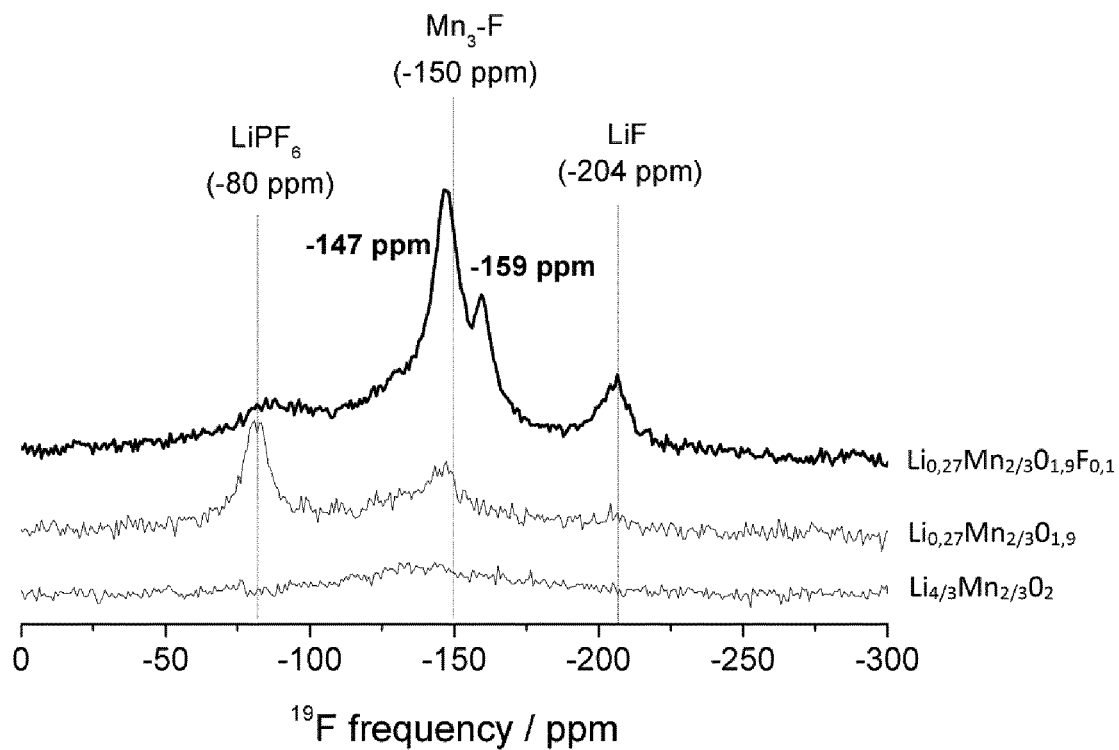

FIG. 3 discloses $^{19}F$ solid-state MAS NMR spectra of the oxide of formula $Li_{4/3}Mn_{2/3}O_2$, oxygen-deficient oxide of formula $Li_xMn_{2/3}O_{2-u}$ and the fluorinated oxide of formula $Li_xMn_{2/3}O_{2-u}F_t$.

Figure 4:
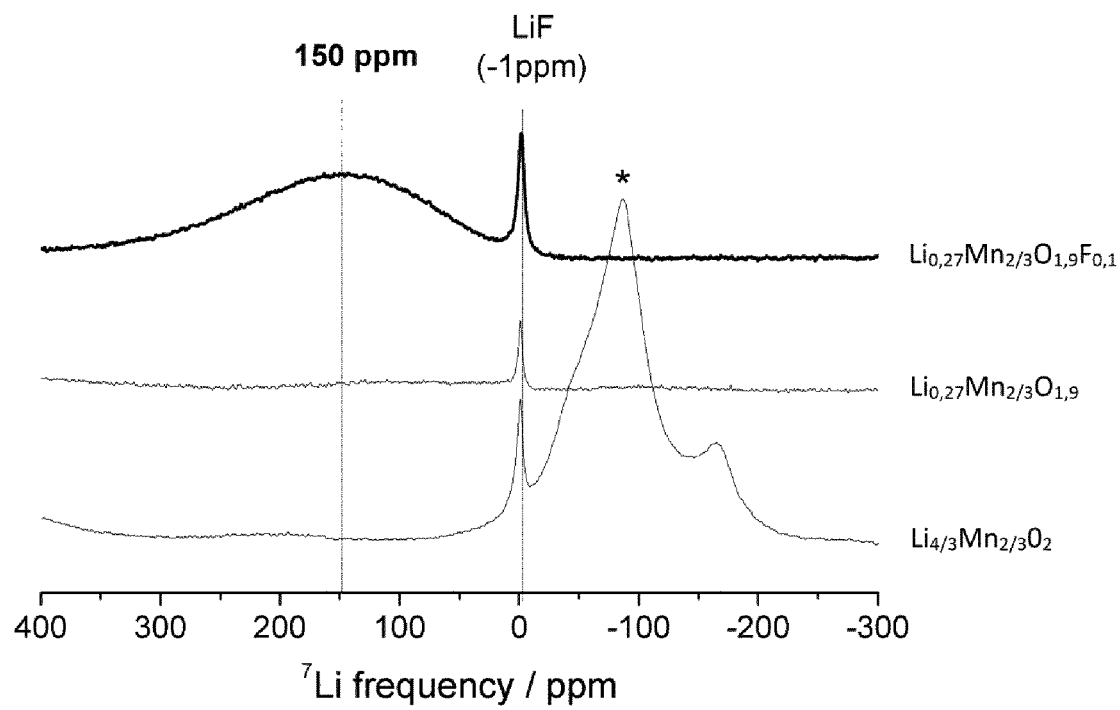

FIG. 4 discloses $^7$Li solid-state MAS NMR spectra of oxide of formula $Li_{4/3}Mn_{2/3}O_2$, oxygen-deficient oxide of formula $Li_xMn_{2/3}O_{2-u}$ and the fluorinated oxide of formula $Li_xMn_{2/3}O_{2-u}F_t$.

Figure 5:
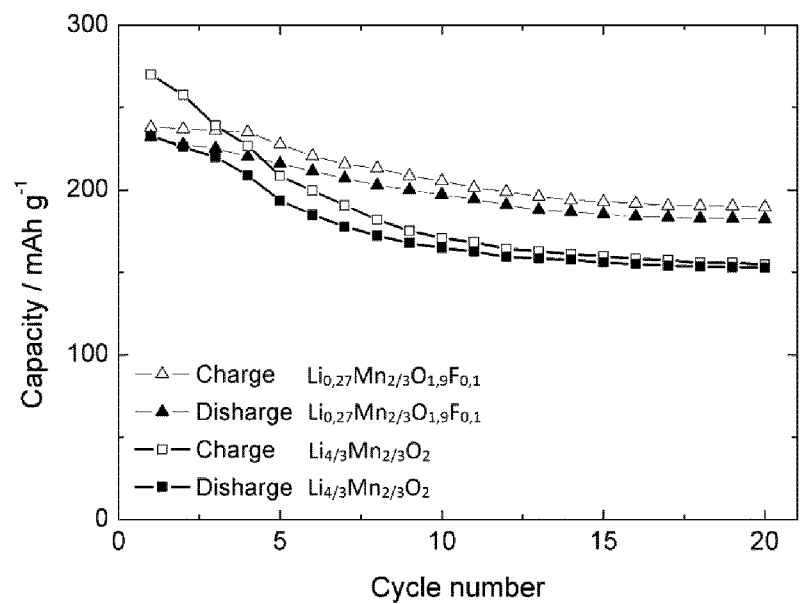

FIG. 5 discloses the comparison of cycling performance for the oxide of formula $Li_{4/3}Mn_{2/3}O_2$ and for the fluorinated oxide of example 4.

Figure 6:
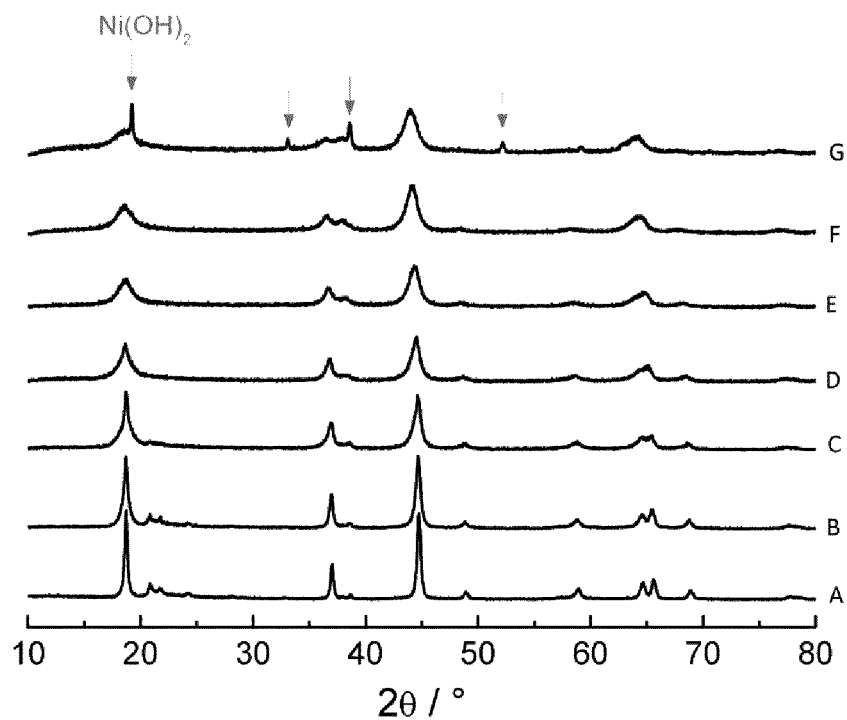

FIG. 6 highlights the evolution of the X-ray diffraction (XRD) patterns of the oxides of formula $Li_{4/3}Mn_yNi_zO_2$ with the content of Ni. On FIG. 6, the oxides are characterized by the following parameters y and z:

|   | y | z |
|---|---|---|
| A | 2/3 | 0 |
| B | 1.8/3 | 0.2/3 |
| C | 1.6/3 | 0.4/3 |
| D | 1.4/3 | 0.2 |
| E | 0.4 | 0.8/3 |
| F | 1/3 | 1/3 |
| G | 0.8/3 | 0.4 |

Figure 7:
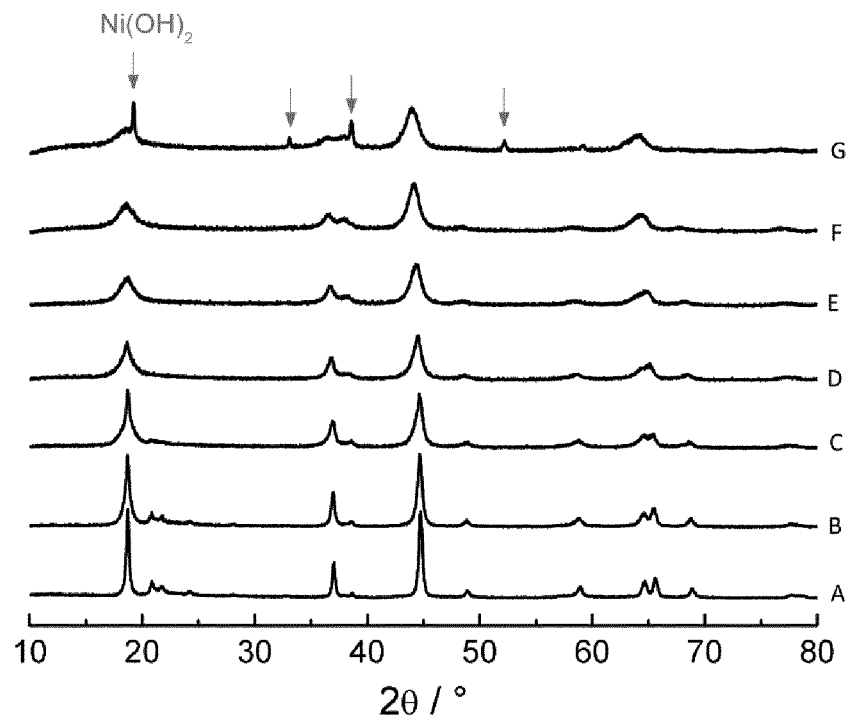

FIG. 7 highlights the evolution of the X-ray diffraction (XRD) patterns of the oxides of formula $Li_{4/3}Mn_yCo_wO_2$ with the content of Co. On FIG. 7, the oxides are characterized by the following parameters y and w:

|   | y | w |
|---|---|---|
| A | 2/3 | 0 |
| B | 1.8/3 | 0.2/3 |
| C | 1.6/3 | 0.4/3 |
| D | 1.4/3 | 0.2 |
| E | 0.4 | 0.8/3 |

Figure 8:
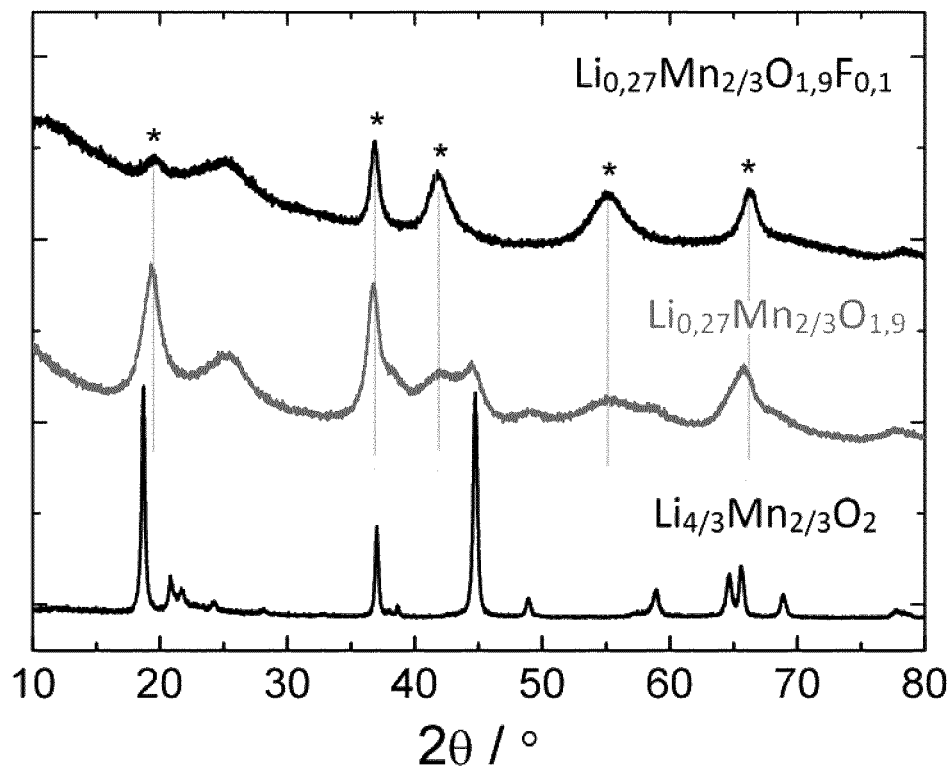

FIG. 8 corresponds to the XRD patterns of the oxide of formula $Li_{4/3}Mn_{2/3}O_2$, of the oxygen-deficient oxide of formula $Li_xMn_{2/3}O_{2-u}$ and of the fluorinated oxide of formula example 4.

Figure 9:
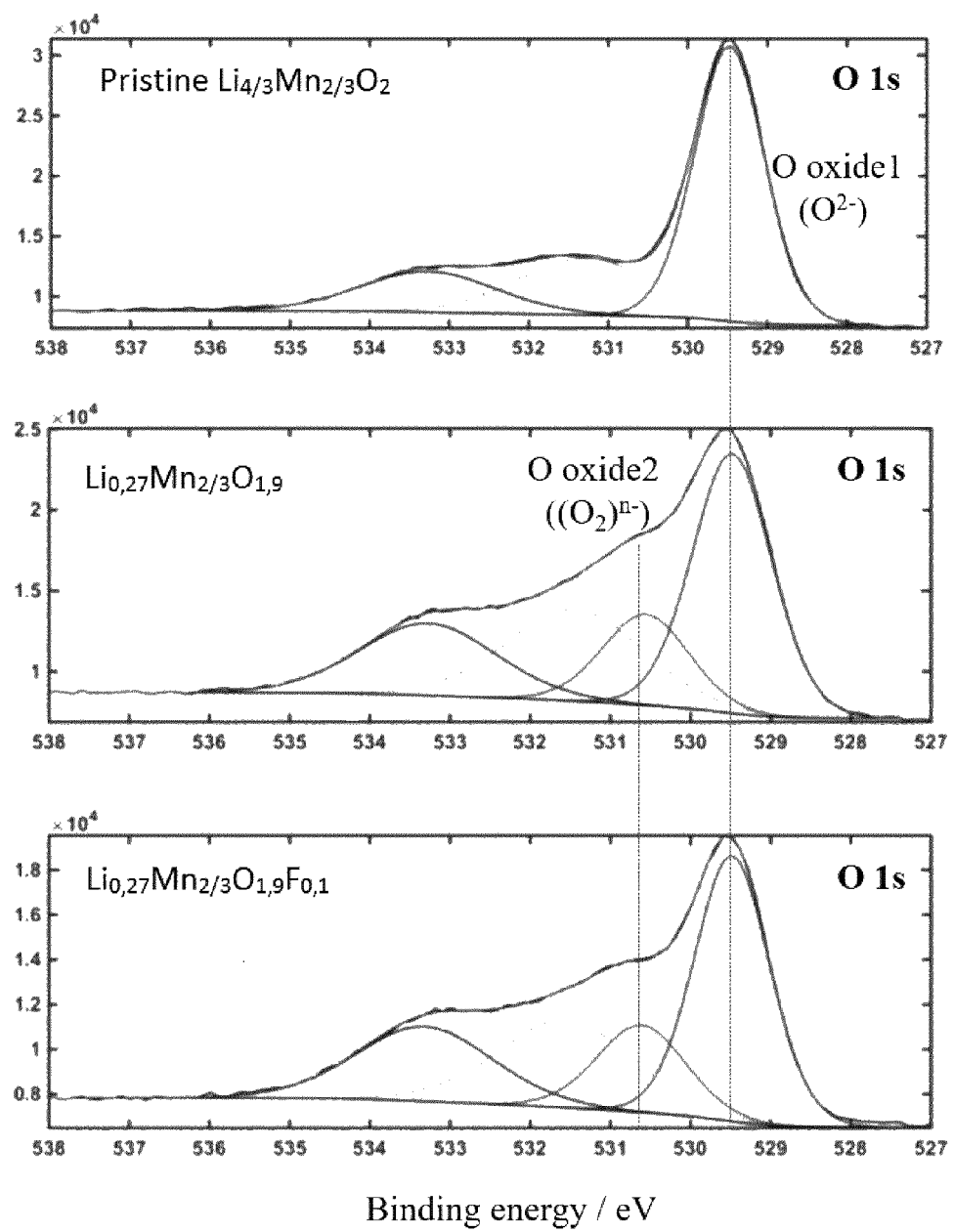

FIG. 9 corresponds to high resolution O 1s X-ray photoelectron spectra (XPS) of the oxide of formula $Li_{4/3}Mn_{2/3}O_2$, of the oxygen-deficient oxide of formula $Li_xMn_{2/3}O_{2-u}$ and of the fluorinated oxide of example 4.

DETAILED DESCRIPTION OF THE INVENTION

The invention relates to a process as defined in the below claims and to an oxide as defined in the below claims. It also relates to a cathode as defined in the below claim, and to a battery as defined in the below claim.

The process makes it possible to prepare a Li-rich layered oxide based on Mn and optionally on Ni and/or Co in which F is incorporated within the crystal of the oxide, consisting in incorporating fluorine into the oxygen vacancies of an oxygen-deficient oxide of formula (II):

(II)

wherein:
0<x<2/3;
0<y≤2/3;
z≥0;
w≥0;
1/3<y+z+w<2/3;
0<u<2/3;
the fluorine being provided by a fluorinating agent.

In the context of the invention, the Li-rich layered oxide based on Mn and optionally on Ni and/or Co in which F is incorporated within the crystal of the oxide is designated throughout the present application (including the claims) by the term "fluorinated oxide".

The process of preparation of the fluorinated oxide also consists in contacting an oxygen-deficient oxide of formula (II):

(II)

wherein:
0<x<2/3;
0<y≤2/3;
z≥0;
w≥0;
1/3<y+z+w<2/3;
0<u<2/3;
with an atmosphere comprising the fluorinated reactive species generated by the thermal decomposition of a fluorinating agent.

The fluorinated oxide may more particularly be characterized by formula (I):

(I)

wherein:
0<x<2/3;
0<y≤2/3;
z≥0;
w≥0;
1/3<y+z+w<2/3;
0<u<2/3;
0<t≤u;
and wherein n' and n" correspond to the average oxidation states of respectively Ni and Co, n' ranging from +II to +IV and n" ranging from +III to +IV.

The fluorinated oxide is a neutral compound. This implies more particularly that x, y, z, w, n', n", u and t are correlated to ensure electroneutrality. The following mathematical relationship may thus apply:

$$x+4y+n'z+n''w=2(2-u)+t$$

u corresponds to the number of oxygen vacancies present in the oxygen-deficient oxide of formula (II) that are required for the incorporation of fluorine into the crystal, u is less than 2/3 (u<2/3), more particularly less than 1/2 (u<1/2), and even more particularly less than 1/3 (u<1/3). As is evidenced for the fluorinated oxide of example 4, u may be less than 0.2, more particularly less than 0.15. The presence of the oxygen vacancies may be confirmed by analytical techniques such as EXAFS (Extended X-Ray Absorption Fine Structure), neutron diffraction and TEM (Transmission Electron Microscopy) or a combination of these techniques.

In the fluorinated oxide, the oxidation state of Mn is +IV. Mn is present to stabilize the fluorinated oxide and the oxygen-deficient oxide. The stoichiometry in Mn, y, should preferably be high enough so that the fluorinated oxide and the oxygen-deficient oxide exist in the form of layered structures. y is such that 0<y≤2/3. More particularly, 1/3<y≤2/3.

n' corresponds to the average oxidation state of Ni. n" corresponds to the average oxidation state of Co. In the fluorinated oxide, n' may range from +II to +IV and is preferably +IV. n" may range from +III to +IV and is preferably +IV.

F is incorporated within the crystal of the fluorinated oxide. The fluorinated oxide exhibits an O1-type layered structure which may be confirmed by XRD. The amount of F in the fluorinated oxide depends on the number of oxygen vacancies (u) in the oxygen-deficient oxide. Thus, the following relationship applies: $0 < t \leq u$. The amount of F also depends on the conditions of the process such as the duration of the contact between the oxygen-deficient oxide and the atmosphere comprising the fluorinated reactive species or the temperature at which the fluorination is performed. Under the conditions explored, it was possible to obtain t=u.

The fluorinated oxide may be based on Mn only (w=z=0), Mn and Ni only (w=0) or Mn and Co only (z=0). Mn needs to be present (y>0). The fluorinated oxide may be one disclosed in the examples. An example of a fluorinated oxide based on Mn only is $Li_xMn_{2/3}O_{2-u}F_t$.

The process of the invention involves the thermal decomposition of the fluorinated agent which generates fluorinated reactive species. Without being bound by any theory, the fluorinated reactive species may be for instance radicals F° or ionic fluorine F. The fluorinating agent may be selected in the group consisting of HF, $F_2$, $XeF_2$, $TbF_4$, $CeF_4$, $CoF_3$, $AgF_2$, $MoF_3$, AgF, $CuF_2$, $FeF_3$, CuF, $VF_3$ and $CrF_3$. The fluorinating agent may also be a fluorinated organic compound. It may be for instance a fluorinated polymer such as PVDF or PTFE. $XeF_2$ proves to be a good fluorinating agent as the fluorinated reactive species are generated at temperatures below 100° C. $TbF_4$ and $CeF_4$ are also good fluorinating agents as the decomposition products comprising Tb or Ce may be recycled for the preparation of the fluorinating agent.

The process is thus performed by contacting the oxygen-deficient oxide of formula (II) with an atmosphere comprising the fluorinated reactive species generated by the thermal decomposition of the fluorinating agent. The thermal decomposition of the fluorinating agent may be conducted at a temperature which is comprised between 30° C. and 500° C. When the fluorinating agent is $XeF_2$, the temperature of decomposition may be more particularly between 80° C. and 100° C. When the fluorinating agent is $TbF_4$ or $CeF_4$, the temperature of decomposition may be more particularly between 100° C. and 500° C. The duration of the fluorination depends on the nature of the fluorinating agent and of the concentration in the atmosphere of the fluorinated reactive species. When the fluorinating agent is $XeF_2$, the duration may be between 10 hours and 72 hours.

As the oxygen-deficient oxide of formula (II) may be sensitive to $O_2$ or $H_2O$, the atmosphere preferably consists of an inert gas comprising the fluorinated reactive species generated by the decomposition of the fluorinating agent. The inert gas may for instance be argon or nitrogen.

A particular process of preparation of the fluorinated oxide consists in placing the oxygen-deficient oxide of formula (II) and the fluorinating agent in a confined vessel and in decomposing the fluorinated agent, so as to generate the fluorinated reactive species.

The process may be performed by using the oxygen-deficient oxide as such. The process may also be performed by using a composite material comprising the oxygen-deficient oxide obtained by the electrochemical delithiation applied to a composite material comprising the oxide of formula (III) which is described below. Example 4 illustrates this particular process.

Unlike known processes, the process of the invention makes it also possible to obtain a fluorinated oxide with a low amount of LiF. This may be deduced from XRD wherein the XRD diagram of the fluorinated oxide does not exhibit the contribution of crystalline LiF. This may also be deduced from a spectrum obtained by $^{19}F$ solid-state MAS NMR spectroscopy for which the intensity of the peak of LiF($I_{LiF}$) is such that:

$$0 < I_{LiF}/I_F \leq 0.50, \text{ more particularly } \leq 0.30$$

wherein:
$I_{LiF}$ designates the intensity of the peak of LiF;
$I_F$ designates the intensity of the peak of fluorine incorporated within the crystal of the fluorinated oxide.

Thus, the invention also relates to a fluorinated oxide as described in the below claims.

Following the incorporation of fluorine, the fluorine within the crystal is surrounded by the metal(s) in its close vicinity. The peak of fluorine incorporated within the crystal of the fluorinated oxide thus exhibits a chemical shift $\delta_F$ around −150 ppm. $\delta_F$ may be between −140 ppm and −160 ppm.

The peak of LiF is usually centred at a chemical shift $\delta_F$ around −204 ppm. $\delta_F$ may be between −200 ppm and −210 ppm. The position of the peak of LiF may be confirmed by a spectrum of pure LiF conducted in the same analytical conditions. The intensities are measured from the baseline of the corresponding peak. Deconvolution may be applied for the case the peaks are overlapped with other peaks.

The incorporation of fluorine in the crystal may also be deduced from a spectrum obtained by $^7Li$ NMR for which broad peak is present and centred at a positive chemical shift ($\delta_{Li} > 0$ ppm). The peak is centred at a chemical shift $\delta_{Li}$ comprised between 100 ppm and 200 ppm. The width at half peak may be between 150 ppm and 200 ppm.

The oxygen-deficient oxide (II) is characterized by XRD. The oxygen-deficient oxide (II) may exhibit a layered prismatic-like structure. The oxygen-deficient oxide of formula (II) may be prepared by the electrochemical delithiation of the oxide of formula (III):

$$Li[Li_{x'}Mn^{IV}_yNi^{n'}_zCo^{n''}_w]O_2 \quad \quad \quad (III)$$

wherein:
$0 < x' < 1/3$;
y, z and w having the same values as in formula (I);
n' may range from +II to +IV and is preferably +II;
n'' may range from +III to +IV and is preferably +III.

The oxide of formula (III) is neutral. This implies that x', y, z, w, n', n'' are correlated to ensure electroneutrality. The following mathematical relationship may thus apply:

$$x' + 4y + n'z + n''w = 3$$

The electrochemical delithiation triggers the creation of oxygen vacancies in the oxide of formula (III). The oxygen-deficient oxide of formula (II) is characterized by the presence of peroxo-like species ($O_2^{m-}$ with m=1 or 2) as can be confirmed by X-ray photoelectron spectroscopy (XPS). These species were shown to be stable after fluorination, so that the fluorinated oxide may also contain peroxo-like species.

An example of oxide of formula (III) is $Li_2MnO_3$ (example 1) which corresponds to $Li[Li_{1/3}Mn_{2/3}]O_2$ (x'=1/3; w=z=0).

The electrochemical delithiation consists in subjecting the oxide of formula (III) to an electrochemical oxidation up to a potential that makes it possible to fully oxidize the transition metals without irreversibly damaging the structure of the oxide. This potential may preferably range from 4.5 V to 5.0 V vs $Li^+/Li$. In practice, the electrochemical delithiation may conveniently consist in using an electrode made of a composite material comprising the oxide of formula (III). The composite material is prepared by compounding the oxide of formula (III) with conductive carbon. The composite material usually comprises more than 50.0 wt % of the oxide of formula (III). The composite material may comprise less than 50.0 wt % of the conductive material. The proportion of the oxide may be comprised between 70.0 wt % and 90.0 wt %. The proportion of the conductive material may be comprised between 10.0 wt % and 30.0 wt %. It is preferable to thoroughly compound the two solids so as to obtain a composite material wherein the solids are intimately mixed. Ball milling may conveniently be used to prepare the composite material as is disclosed in the examples (example 4).

The oxide of formula (III) is prepared by the solvothermal precipitation which is described below:
  a) under stirring, an aqueous solution of LiOH is added drop-by-drop to an aqueous solution containing $MnSO_4 \cdot H_2O$, $(NH_4)_2S_2O_8$ and optionally a salts of $Ni^{II}$ and/or a salt of $Co^{II}$. The following salts of $Ni^{II}$ and $Co^{II}$ may be used: $NiSO_4 \cdot 6H_2O$ and $CoSO_4 \cdot 7H_2O$.

The solution is characterized by a molar ratio $R=[S_2O_8^{2-}]/([Mn^{2+}]+[Ni^{2+}]$ and/or $[Co^{2+}])$ comprised between 1.1 and 1.6, more particularly between 1.1 and 1.3.

The total amount of LiOH added is such that the molar ratio $R'=Li^+/([Mn^{2+}]+[Ni^{2+}]$ and/or $[Co^{2+}])$ is higher than 10, preferably comprised between 10 and 11. If R' is less than 10, a minor spinel $LiMn_2O_4$ impurity phase may be formed. The duration of the addition of the solution of LiOH is comprised between 5 and 15 minutes. The solutions may be at a temperature comprised between 10 and 30° C.
  b) The solution obtained at the end of step a) is heated at a temperature higher than 100° C. so as to obtain a precipitate. The mixture may be heated at a temperature between 100° C. and 250° C., more particularly at a temperature between 150° C. and 220° C. The duration of the heating may be comprised between 6 hours and 48 hours. The temperature and the duration may be modified to control the particle size and the degree of disorder within the stacking of the ordered $Li_{1/3}Mn_{2/3}$ sheets. With the increase of the temperature up to 200° C., the particle size and the stacking disorder tend to increase while at 250° C., the stacking disorder decreases. Similarly for the reaction duration, while increasing the duration up to 24 h will increase the particles size and the stacking disorder, in contrast, up to 48 h will lead to decrease the stacking disorder.
  c) The oxide of formula (III) obtained in step b) is recovered and dried.

The oxide of formula (III) may optionally be washed with water. Drying is performed at a temperature higher than 50° C. The temperature of drying may be comprised between 50° C. and 150° C. Vacuum may also be applied during drying to help remove the physisorbed water. A vacuum with a pressure lower than $10^{-3}$ mbar may be applied.

The solvothermal precipitation makes it possible to obtain easily the oxide of formula (III) in the form of nanoparticles with a controlled morphology and size and exhibiting good electrical conductivity (see e.g. example 1). The solvothermal process thus appears superior to the ceramic process which requires annealing at high temperature (400° C.) for a long period of time (3 weeks or more). This process helps prepare an homogeneous oxide that is used in the electrochemical delithiation. The nanoparticles of the oxide of formula (III) may be characterized by an average size $d_{XRD}$ comprised between 10 and 50 nm, wherein $d_{XRD}$ is the isotropic average size of the crystalline domains. $d_{XRD}$ is determined by XRD by structural refinement using the Thompson-Cox-Hastings pseudo-Voigt peak shape.

The control of the size of the particles of the oxide of formula (III) ensures to also get a control of the size and morphology of the particles of the fluorinated oxide. Thus, an advantage of the process of the invention is to control the size and morphology of the fluorinated oxide. The fluorinated oxide may thus be in the form of nanoparticles. More particularly, the particles of the fluorinated oxide may be characterized by a D50 comprised below 100 nm, D50 being the median diameter determined from a distribution (in volume) obtained by laser diffraction. Laser particle sizer like Horiba LA-910 may be used following the guidelines of the constructor. Moreover, as for the oxide of formula (III), $d_{XRD}$ for the fluorinated oxide may also be comprised between 10 and 50 nm, wherein $d_{XRD}$ is the isotropic average size of the crystalline domains. The determination of D50 may be performed when the oxide is dispersed in water.

The nanoparticles of the oxide of formula (III) can be described as secondary particles consisting of primary particles aggregated, the size $d_{SEM}$ (as measured with SEM) of the primary particles being between 30 and 200 nm. The secondary particles are of different shapes (spheres, hexagones, rods, . . . ). This applies also to the fluorinated oxide.

The oxide of formula (III) exhibits an O3-like structure.

In the inorganic oxides disclosed above (fluorinated oxide, oxygen-deficient oxide and oxide of formula (III)), part of the $Li^+$ may be substituted by $Mg^{2+}$ with adjustment of the composition to ensure electroneutrality.

Use of the Fluorinated Oxide

The fluorinated oxide may be used as a component of a cathode of a battery. The cathode typically comprises or consists in a composite material C comprising the fluorinated oxide, at least one conductive material and optionally at least one polymer binder. The composite material C usually comprises more than 50.0 wt % of the fluorinated oxide. The composite material C may comprise less than 50.0 wt % of the conductive material. The proportion of the fluorinated oxide may be comprised between 70.0 wt % and 90.0 wt %. The proportion of the conductive material may be comprised between 10.0 wt % and 30.0 wt %.

The conductive material is typically conductive carbon, such as carbon black (e.g. Carbon black, Super P® commercialized by Alfa Aesar). The polymer binder is typically a vinylidenefluoride-based (co)polymer. The polymer binder may for instance be a polymer of VDF or a copolymer of VDF and HFP wherein VDF is vinylidene fluoride and HFP is hexafluoropropylene.

The cathode may be prepared by the process which comprises the following steps:
  a slurry comprising the fluorinated oxide, the conductive material, the polymer binder, if any, and a suitable solvent is coated onto a current collector such as an aluminum foil;
  the solvent is removed.

The slurry is prepared by mixing the fluorinated oxide, the conductive material, the polymer binder, if any, and the solvent. The polymer binder is preferably dissolved in the solvent. The solvent is suitable to dissolve the polymer binder. It may be N-methylpyrrolidone. An example of process of preparation of a cathode may be more particularly found on pages 19-20 of WO 2013/180781.

The invention also relates to a battery comprising the cathode. The battery usually comprises the cathode, an anode, an electrolyte ensuring electronic insulation and ionic conduction and a separator if the electrolyte is liquid.

The electrolyte may be solid and composed of inorganic lithium conductors or lithium conductive polymers with or without lithium salts. The electrolyte may also be liquid and composed of lithium salts dissolved in a blend of solvent with optionally the use of additives. The lithium salt is preferably selected from the group consisting of $LiPF_6$, $LiBF_4$, $LiClO_4$, lithium bis(oxalato)borate ("LiBOB"), $LiN(SO_2F)_2$, $LiN(CF_3SO_2)_2$, $LiN(C_2F_5SO_2)_2$, $Li[N(CF_3SO_2)(RFSO_2)]_n$ with RF being $C_2F_5$, $C_4F_9$, $CF_3OCF_2CF_2$, $LiAsF_6$, $LiC(CF_3SO_2)_3$ and mixtures thereof. More preferably, the salt is $LiPF_6$. The lithium salt is preferably dissolved in the organic carbonate-based solvent. The organic carbonate-based solvent may be selected in the group consisting of unsaturated cyclic carbonates (e.g. ethylene carbonate (EC), propylene carbonate (PC), butylene carbonate, fluoroethylene carbonate and fluoropropylene carbonate) and unsaturated acyclic carbonates (e.g. dimethylcarbonate (DMC), diethylcarbonate (DEC), ethylmethylcarbonate (EMC), and fluorinated acyclic carbonates). Other suitable solvents that may be used in combination with carbonates are esters (e.g. propyl propionate (PP), ethyl propionate (EP)).

When the electrolyte is liquid, a separator is needed. The separator is typically a microporous membrane of polyolefin (e.g. polyethylene or polypropylene) or a non-woven separator. The separator may be coated with ceramics to increase safety.

The anode is usually made of a lithium metal foil or of a lithium alloy composition including notably those described in U.S. Pat. No. 6,203,944 or in WO 00/03444. Lithium ion batteries are made using either: 1) graphitic carbons able to intercalate lithium, typically existing in forms such as powders, flakes, fibers or spheres (for example, mesocarbon microbeads) hosting lithium. The use of prelithiated graphite (as described for example in U.S. Pat. No. 5,759,715) is preferred. 2) lithium titanates of formula $Li_4Ti_5O_2$; 3) lithium-silicon alloys, generally known as lithium silicides with high Li/Si ratios, in particular lithium silicides of formula $Li_{4.4}Si$; 4) lithium-germanium alloys, including crystalline phases of formula $Li_{4.4}Ge$.

EXAMPLES

Example 1: Synthesis of $Li_{4/3}Mn_{2/3}O_2$ $Li_{4/3}Mn_{2/3}O_2$ (or $Li_2MnO_3$) is prepared by the solvothermal precipitation process. The protocol comprises dissolving a solution containing 5 mL of MilliQ water with 0.003 moles of $MnSO_4 \cdot H_2O$ and 0.0045 moles $(NH_4)_2S_2O_8$ with a fixed ratio of $R=[S_2O_8^{2-}]/[Mn^{2+}]=1.5$. The solution was stirred at room temperature for 10 minutes in a 25 mL Teflon lined container, 10 mL 3M of LiOH were added drop-by-drop and the solution was stirred for another 10 minutes. After sealing, the solution was heated at a fixed temperature of 200° C. for 24 h. After cooling to room temperature, the powder was recovered from the solution using centrifugation and washed several times with MilliQ water, and dried at 80° C. for 10 h. The recovered powder was further outgassed at 100° C. under vacuum for 10 h.

The structural analysis of as-prepared compound was first investigated by X-ray diffraction (XRD). The XRD pattern is characteristic of a monoclinic C2/m structure for as-prepared compound. Elemental composition analysis by using ICP-OES showed the Li/Mn ratio is 1.97, confirming as-prepared compound having a chemical formula $Li_{4/3}Mn_{2/3}O_2$. The morphology and particles size were studied by scanning electron microscopy (SEM), demonstrating the that the particles of $Li_{4/3}Mn_{2/3}O_2$ are nanometric with an average articles size of ~50 nm, as is shown on FIG. 1.

Example 2: Electrochemical Test of $Li_{4/3}Mn_{2/3}O_2$ Compound Obtained in Example 1

A cathode was prepared by mixing 70 wt % of the compound of Example 1 and 30 wt % of Super P® carbon by weight, mixed by SPEX high-energy ball mill for 20 minutes. Lithium deinsertion-insertion reactions are written as follows:

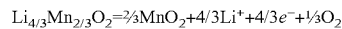

Based on the $4/3Li^+$ extraction, the theoretical capacity (or amount of charge) that can be stored is 460 mAh·g$^{-1}$. The cathode obtained was used in a lithium battery comprising a lithium metal anode and using the electrolyte of 1 M Lithium hexafluorophosphate ($LiPF_6$) in a mixture of Ethylene Carbonate (EC)/Propylene Carbonate (PC)/Dimethyl Carbonate (DMC) (1:1:3 vol. %). This battery was operated at a current density of C/20 (1C=460 mA·g$^{-1}$) within a potential range of 2-4.8 V vs. Li$^+$/Li. The first charge capacity is ~350 mAh·g$^{-1}$, it then drops to ~250 mAh·g$^{-1}$ while discharging, showing a large irreversible capacity loss. Upon cycling, the capacity stabilizes around 150-160 mAh·g$^{-1}$ over 40 cycles, as shown on FIG. 2, demonstrating a good reversibility of the system.

Example 3: Gas Release Test of $Li_{4/3}Mn_{2/3}O_2$ Obtained in Example 1

According to previous studies, oxygen loss may occur on charge in the Li-rich layered oxide electrodes. To check this point, gas pressure analysis was carried out upon the first charge/discharge cycle. As $Li_xMn_{2/3}O_{2-u}$ was charged, the pressure increased. From the pressure increase and mass spectrometry analysis, it can be deduced that approximately 0.157 gas molecules are released per initial $Li_{4/3}Mn_{2/3}O_2$ with the nature of the gas being $CO_2$ (m/z=44) and $O_2$ (m/z=32) at the very end of oxidation. As expected for a four-electron $O^{2-}/O_2$ transformation, this would lead to an irreversible loss of ~0.2 electrons, hence a stoichiometry for the charged product close to $Li_{0.27}Mn_{2/3}O_{1.9}$. ICP-OES analysis confirmed the Li/Mn ratio is 0.37(3) for the charged product, in good agreement with electrochemistry.

Example 4: Preparation of $Li_{0.27}Mn_{2/3}O_{1.9}F_{0.1}$

The electrode comprising 70 wt. % $Li_{4/3}Mn_{2/3}O_2$ and 30 wt. % carbon was charged at 4.80 V vs. Li$^+$/Li at a current rate of C/20 to obtain the oxygen-deficient $Li_{0.27}Mn_{2/3}O_{1.9}$ electrode, and the electrode was recovered and washed by dimethyl ether (DME), dried under vacuum in an argon-filled glove-box. Then, the recovered $Li_{0.27}Mn_{2/3}O_{1.9}$ electrode powder sample was placed in a pre-fluorinated nickel crucible, the desired amount of $XeF_2$ was separately placed in a Teflon-line container and loaded the nickel crucible into the Teflon lined container, then sealed into an autoclave in the argon-filled glove-box. The autoclave was heated at 90° C. for 12 hours, and the powder was recovered in the argon-filled glove-box.

Elemental composition analysis using ICP-OES confirmed the Li/Mn ratio is unchanged before and after fluorination at 0.37 and 0.36, respectively. Insight into the local structural environments in $Li_{0.4}MnO_{2.85}F_{0.15}$ sample is obtained using $^{19}F$ and $^7Li$ solid-state MAS NMR spectroscopy, in comparison with oxide $Li_{4/3}Mn_{2/3}O_2$ and oxygen-deficient $Li_{0.27}Mn_{2/3}O_{1.9}$ sample, shown in FIGS. 3 and 4. The $^{19}F$ NMR spectrum of FIG. 3 exhibits three distinct lines at −80, −150 and −204 ppm that could be assigned to fluorine in the vicinity of different environments, i.e., species $LiPF_6$, $Mn_3$—F and LiF. The appearance of new fluorine local environments at around −150 ppm suggests the fluorine substitution to the oxygen lattice. The $^7Li$ NMR spectrum of FIG. 4 also confirms the new environment of lithium at around 150 ppm for $Li_{0.27}Mn_{2/3}O_{1.9}F_{0.1}$ sample.

Example 5: Electrochemical Test of the $Li_{0.27}Mn_{2/3}O_{1.9}F_{0.1}$ Obtained in Example 4

The cathode is disclosed in Example 4 and is obtained after the reaction with $XeF_2$. The cathode was used in a lithium battery comprising a lithium metal anode and using the electrolyte of 1 M Lithium hexafluorophosphate ($LiPF_6$) in the mixture of Ethylene Carbonate (EC)/Propylene Carbonate (PC)/Dimethyl Carbonate (DMC) (1:1:3 vol. %).

The electrode was initially activated by discharging to 2 V vs. $Li^+/Li$ at a current density of C/20. This battery has been operated at a current density of C/20 within a potential range of 2-4.5 V vs. $Li^+/Li$. The first charge capacity is ~240 $mAh \cdot g^{-1}$, it maintains at ~230 $mAh \cdot g^{-1}$ while discharging, indicating a good reversible capacity. Upon cycling, the capacity stabilizes around ~190 $mAh \cdot g^{-1}$ over 20 cycles demonstrating a good reversibility of the system.

Comparative Example 6

A Li-battery was also electrochemically characterized as in example 5 and in comparative example 6 except that the working electrode was prepared with the pure $Li_{4/3}Mn_{2/3}O_2$ obtained in example 1. The $Li_{4/3}Mn_{2/3}O_2$ obtained in example 1 is first activated for 1 cycle at a current density of C/20 within a potential range of 2-4.8 V vs. $Li^+/Li$. This battery was operated at a current density of C/20 within a potential range of 2-4.5 V vs. $Li^+/Li$. It appears that the compound of Example 1 ($Li_{4/3}Mn_{2/3}O_2$) and the fluorinated oxide of Example 4 ($Li_{0.27}Mn_{2/3}O_{1.9}F_{0.1}$) after activation, showing modified smooth electrochemical signature for $Li_{0.27}Mn_{2/3}O_{1.9}F_{0.1}$ with slightly improved average potential and capacity for the initial cycles. Upon cycling, the capacity stabilizes around ~160 $mAh \cdot g^{-1}$ over 20 cycles. On the other hand, as can be seen on FIG. 5, cycling performance tests are carried out on the batteries comprising of example 1 and of example 4 demonstrate better cycling performance of the fluorinated oxide of example 4.

Example 7: Synthesis of Ni-Substituted and Co-Substituted $Li_{4/3}Mn_{2/3}O_2$ Compounds Besides Li-rich $Li_{4/3}Mn_{2/3}O_2$, the possibility of a partial substitution of Mn by Ni and Co was also explored by the soft chemical synthesis disclosed before (solvothermal process). The Ni-substituted and Co-substituted $Li_{4/3}Mn_{2/3}O_2$ are also prepared by the solvothermal precipitation described before. The protocol comprises dissolving a solution containing 5 mL of MilliQ water with desired amount of $MnSO_4 \cdot H_2O$ and $NiSO_4 \cdot 6H_2O$ (or $CoSO_4 \cdot 7H_2O$), and the amount of $(NH_4)_2S_2O_8$ was added and mixed at a fixed ratio of $R=[S_2O_8]^{2-}/M^{2+}=1.5$ (M=Mn+Ni or Mn+Co), the mixture was stirred at room temperature for 10 minutes in a 25 mL Teflon lined container, and 10 mL 3M of LiOH was added drop-by-drop and stirring for another 10 minutes. After sealing, the solution was heated at a fixed temperature of 200° C. for 24 h. After cooling to room temperature, the powder was recovered from the solution using centrifugation and washed several times with MilliQ water, and dried at 80° C. for 10 h. The recovered powder was further outgassed at 100° C. under vacuum for 10 h.

The structural analysis for as-prepared compounds was first investigated by X-ray diffraction (XRD). The XRD patterns obtained are shown in FIGS. 6 and 7, characteristic of a layered structure for as-prepared compounds up to 50% of Ni and 30% of Co substitution by molar ratio.

The invention claimed is:

1. A process for preparation of particles of a Li-rich crystalline fluorinated layered oxide based on Mn, in which F is incorporated within a crystal of the Li-rich crystalline fluorinated layered oxide, the process consisting of incorporating fluorine into a number of oxygen vacancies of an oxygen-deficient oxide of formula (II):

$$[Li_xMn^{IV}_yNi^{IV}_zCo^{IV}_w]O_{2-u} \qquad (II)$$

wherein:
0<x<2/3;
0<y≤2/3;
z≥0;
w≥0;
1/3<y+z+w≤2/3;
0<u<2/3;

to provide the Li-rich crystalline fluorinated layered oxide of formula (I):

$$[Li_xMn^{IV}_yNi^{n'}_zCo^{n''}_w]O_{2-u}F_t \qquad (I)$$

wherein:
0<x<2/3;
0<y≤2/3;
z≥0;
w≥0;
1/3<y+z+w≤2/3;
0<u<2/3;
0<t≤u;
x+4y+n'z+n"w=2(2−u)+t; and n' and n" correspond to an average oxidation state of respectively Ni and Co, n' ranging from +II to +IV and n" ranging from +III to +IV, and wherein the fluorine is provided by a fluorinating agent decomposed so as to generate a fluorinated reactive species.

2. The process according to claim 1, wherein the process consists of contacting the oxygen-deficient oxide with an atmosphere comprising the fluorinated reactive species generated by thermal decomposition of the fluorinating agent.

3. The process according to claim 2 wherein the oxygen-deficient oxide and the fluorinating agent are placed in a confined vessel, the fluorinated agent being decomposed so as to generate the fluorinated reactive species.

4. The process according to claim 1, wherein u is less than 1/2; or wherein 1/3≤y≤2/3; or wherein t=u; or wherein:
w=z=0; or
w=0; or
z=0; or
y=2/3 and w=z=0.

5. The process according to claim 1, wherein the particles of the Li-rich crystalline fluorinated layered oxide are characterized by a D50 below 100 nm, D50 being the median diameter determined from a distribution (in volume) obtained by laser diffraction.

6. The process according to claim 1, wherein the fluorinating agent is selected in the group consisting of HF, $F_2$, $XeF_2$, $TbF_4$, $CeF_4$, $CoF_3$, $AgF_2$, $MoF_3$, AgF, $CuF_2$, $FeF_3$, CuF, $VF_3$ and $CrF_3$ or wherein the fluorinated agent is a fluorinated organic compound.

7. The process according to claim 1, wherein the Li-rich crystalline fluorinated layered oxide exhibits an O1-type layered structure.

8. The process according to claim 1, wherein the Li-rich crystalline fluorinated layered oxide is of formula $Li_xMn_{2/3}O_{2-u}F_t$;

wherein:
$0 < x < 2/3$;
$0 < u < 2/3$;
$0 < t \leq u$.

9. The Li-rich crystalline fluorinated layered oxide based on Mn of formula (I):

$$[Li_xMn^{IV}_y Ni^{n'}_z Co^{n''}_w]O_{2-u}F_t \qquad (I)$$

wherein:
$0 < x < 2/3$;
$0 < y \leq 2/3$;
$z \geq 0$;
$w \geq 0$;
$1/3 < y+z+w \leq 2/3$;
$0 < u < 2/3$;
$0 < t \leq u$;
$x + 4y + n'z + n''w = 2(2-u) + t$;
wherein
n' and n" correspond to an average oxidation state of respectively Ni and Co, n' ranging from +II to +IV and n" ranging from +III to +IV, and
is obtained by the process according to claim 1.

10. The Li-rich crystalline fluorinated layered oxide based on Mn of claim 9, wherein the Li-rich crystalline fluorinated layered oxide is of formula (I):

$$[Li_xMn^{IV}_y Ni^{n'}_z Co^{n''}_w]O_{2-u}F_t \qquad (I)$$

wherein:
$0 < x < 2/3$;
$0 < y \leq 2/3$;
$z \geq 0$;
$w \geq 0$;
$1/3 < y+z+w \leq 2/3$;
$0 < u < 2/3$;
$0 < t \leq u$;
$x + 4y + n'z + n''w = 2(2-u) + t$;
and wherein n' and n" correspond to an average oxidation state of respectively Ni and Co, n' ranging from +II to +IV and n" ranging from +III to +IV, and
is characterized by the following ratio:

$$0 < I_{LiF}/I_F \leq 0.50,$$

wherein:
$I_{LiF}$ designates an intensity of a peak of LiF centered at a chemical shift between −200 ppm and −210 ppm;
$I_F$ designates an intensity of a peak of fluorine incorporated within the crystal of the Li-rich crystalline fluorinated oxide centered at a chemical shift between −140 ppm and −160 ppm;
wherein both the intensity of the peak of LiF and the intensity of the peak of fluorine are deduced from a spectrum being obtained by $^{19}F$ solid-state MAS NMR spectroscopy.

11. A cathode comprising a composite material comprising the Li-rich crystalline fluorinated layered oxide of claim 9, at least one conductive material and optionally at least one polymer binder.

12. A battery comprising the cathode of claim 11.

* * * * *